United States Patent

Baudot

[11] 4,210,385
[45] Jul. 1, 1980

[54] OPTICAL PANORAMIC SURVEY-SYSTEMS

[75] Inventor: Jean-Jacques Baudot, Ville d'Avray, France

[73] Assignee: Societe Anonyme de Telecommunications, Paris, France

[21] Appl. No.: 879,362

[22] Filed: Feb. 21, 1978

[30] Foreign Application Priority Data

Feb. 23, 1977 [FR] France ............................. 77 05215

[51] Int. Cl.² ........................................... G02B 23/02
[52] U.S. Cl. ...................................................... 350/16
[58] Field of Search ......................................... 350/16

[56] References Cited

U.S. PATENT DOCUMENTS

| | | | |
|---|---|---|---|
| 3,518,016 | 6/1970 | Burdin et al. | 350/16 X |
| 3,558,212 | 1/1971 | Ritchie | 350/16 |
| 3,612,643 | 10/1971 | Weber | 350/16 X |

Primary Examiner—John K. Corbin
Assistant Examiner—Matthew W. Koren
Attorney, Agent, or Firm—Jacobs & Jacobs

[57] ABSTRACT

A device for stabilizing the site of the sight line in an optical panoramic survey system carried by a vehicle, said system comprising a sighting tube rotatably mounted in the vehicle, driving means secured to the vehicle for rotating the tube about the optical axis thereof, and a reflector disposed at the top of the tube and rotatable about an axis normal to the optical axis, comprising a circular guideway, support means attached to the vehicle for supporting said guideway while holding vertical the axis thereof, a member guided along said guideway, a vertically adjustable member supported by said guided member, a link member with a variable length pivotally connected at one end to said adjustable member, a shaft secured to the other end of said link member, said shaft having an axis which intersects the axis of said guideway, means for imparting to said shaft a rotational movement identical with that of the tube, and means for transmitting the angular displacement from said shaft to said reflector with a 1:2 ratio.

5 Claims, 4 Drawing Figures

OPTICAL PANORAMIC SURVEY-SYSTEMS

The present invention is directed to a device for stabilizing the site of the sight line in an optical panoramic survey system carried by a vehicle.

The panoramic survey systems of the periscopic type are known to comprise a sighting tube rotatably mounted in the vehicle, driving means secured to the vehicle for rotating the tube about the optical axis thereof, and a reflector disposed at the top of the tube and rotatable about an axis normal to the optical axis.

In such survey systems, the optical axis of the sighting tube is adjusted to be vertical and the site of the sight line is defined by the angular setting of the rotatable reflector. It will be clear that, for a given setting of the reflector, the site of the sight line can be only held constant throughout the panoramic scanning motion if the optical axis of the tube, also the rotation axis of the panoramic motion, is perfectly vertical.

Since the optical system is carried by a vehicle, it is difficult in practice to keep the optical axis of the tube aligned with the vertical. It might be contemplated to hang the optical system on gyro-stabilized gimbals, but such an arrangement could not be used in practice because of the complexity and bulkiness of the devices involved.

The object of the invention is therefore to stabilize by relatively simple means the site of the sight line in a panoramic survey system carried by a vehicle.

There is provided according to the invention a device for stabilizing the site of the sight line in an optical system of the type specified above, comprising a circular guideway, support means attached to the vehicle for supporting said guideway while holding vertical the axis thereof, a member guided along said guideway, a vertically adjustable member supported by said guided member, a link member with a variable length pivotally connected at one end to said adjustable member, a shaft secured to the other end of said link member, said shaft having an axis which intersects the axis of said guideway, means for imparting to said shaft a rotational movement identical with that of the tube, and means for transmitting the angular displacement from said shaft to said reflector with a 1:2 ratio.

The invention provides for a sighting with a constant site since, if the optical axis of the sighting tube is displaced by an angle α due to motions of the vehicle, the reflector will be displaced by an angle α/2 to exactly compensate for the above displacement. This is provided in a simple manner as the members to be held in a horizontal plane have a little weight, whereas the sighting tube is attached to the vehicle.

The invention will be better understood from the following description of some embodiments shown in the annexed drawings, in which.

Figure 1:
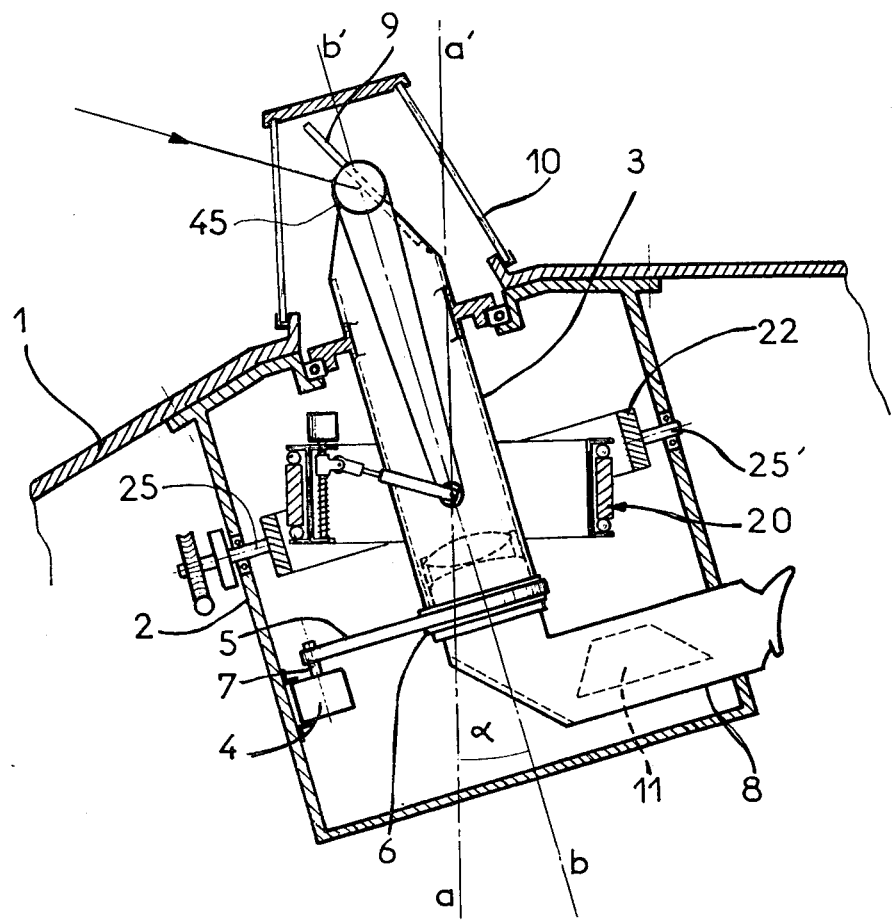
FIG. 1 is a sectional elevation view of an optical periscope-type system provided with a stabilizing device in accordance with a first embodiment of the invention.

There is shown in FIG. 1 the frame 1 of a vehicle to which is secured a housing 2. The housing 2 supports in rotation via a ball bearing the sighting tube 3 of an optical periscope-type system. The sighting tube 3 is driven for rotation about its optical axis bb′ by a motor 4 attached to the housing 2, by means of a driving belt 5 and pulleys 6,7 or any other appropriate means.

The optical system further incorporates a fixed eye-piece 8 connected to the sighting tube 3. Conventionally, a prism 11 is mounted within the eye-piece and is rotated by gears to effect an angular motion one-half that of tube 3. The gears in question are now shown for the sake of clarity.

There is provided at the upper end of tube 3 a mirror 9 rotatably mounted about an axis which is orthogonal to the optical axis bb′. The angular setting of mirror 9 defines the site of the sight line C of the periscope. A protecting cover 10 is secured to the vehicle above mirror 9, the cover 10 having a side surface of transparent material.

In the position shown in FIG. 1, the vehicle lies on a sloping ground. Hence, the optical axis bb′ of the tube 3, bound to the vehicle, is displaced from the vertical aa′ by an angle α. The stabilizing device described below allows the site of the sight line C to be held constant throughout the panoramic scanning motion of the periscope whatever be the variations, caused by the inequalities of the land surface, of the angle α between the optical axis bb′ bound to the vehicle and the vertical aa′.

The stabilizing device comprises a circular guideway 20 connected to the housing 2 by means of gimbals so that to have its symmetry axis constantly aligned with the vertical aa′. The guideway 20 is a ring-shaped member surrounding the sighting tube 3 and secured to a diametrically opposed pair of pivots 21,21′ supported for rotation by an intermediate gimbal 22. Pivot 21 is driven by a motor 23 via a reducing gear, e.g. a worm-and-gear device. The motor 23 is associated with an angular motion sensor 24 to control the angular setting of the pivots in response to the data provided by an external vertical defining station, not shown, carried by the vehicle.

The intermediate gimbal 22 is likewise secured to a diametrically opposed pair of pivots 25,25′ rotatably mounted in the housing 2. The pivot 25 is, like pivot 21, driven by a motor 26 via a reducing gear including a worm 27 and a gear 28, and the motor 26 is associated with an angular motion sensor 29 connected to an external vertical-defining station to servo the angular position of the pivots 25 to the data from the station.

The pivots 25,25′ are so mounted in relation to the housing 2 that their axis intersects the optical axis bb′ of the sighting tube. Hence, the axis of the pivots 21,21′ intersects also the optical axis bb′.

Figure 2:
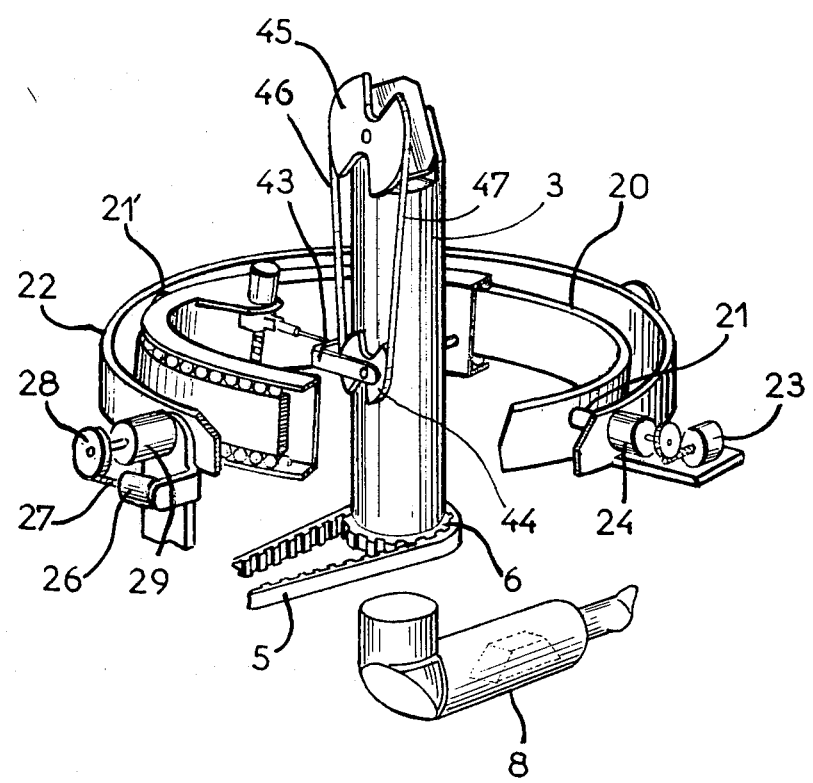
FIG. 2 is a perspective view showing the sighting tube and the stabilizing device of FIG. 1.

The guideway 20 thus defines the horizontal plane in a permanent manner, and the angular setting of the mirror 9 is derived from the reference provided by the guideway 20 by a connection unit described hereinbelow with particular reference to FIGS. 2 and 3.

The guideway 20 includes in the described embodiment a cylindrical part 30 supporting at both axial ends ball bearings 31,31′. A support member 32 is guided along ball bearings 31,31′ through respective bearing members 33,33′ being L-shaped in section. The support member 32 is formed at its ends with legs 34,34′ between which a worm 35 is mounted for rotation, and the worm 35 meshes with a nut 36 which is restrained against angular motion by engagement with the support member 32. The upper leg 34 supports the drive motor 37 of the worm 35 and an angular position sensor 38 which allows display of the position of the nut 36 and thus adjustment of the same.

Figure 3:
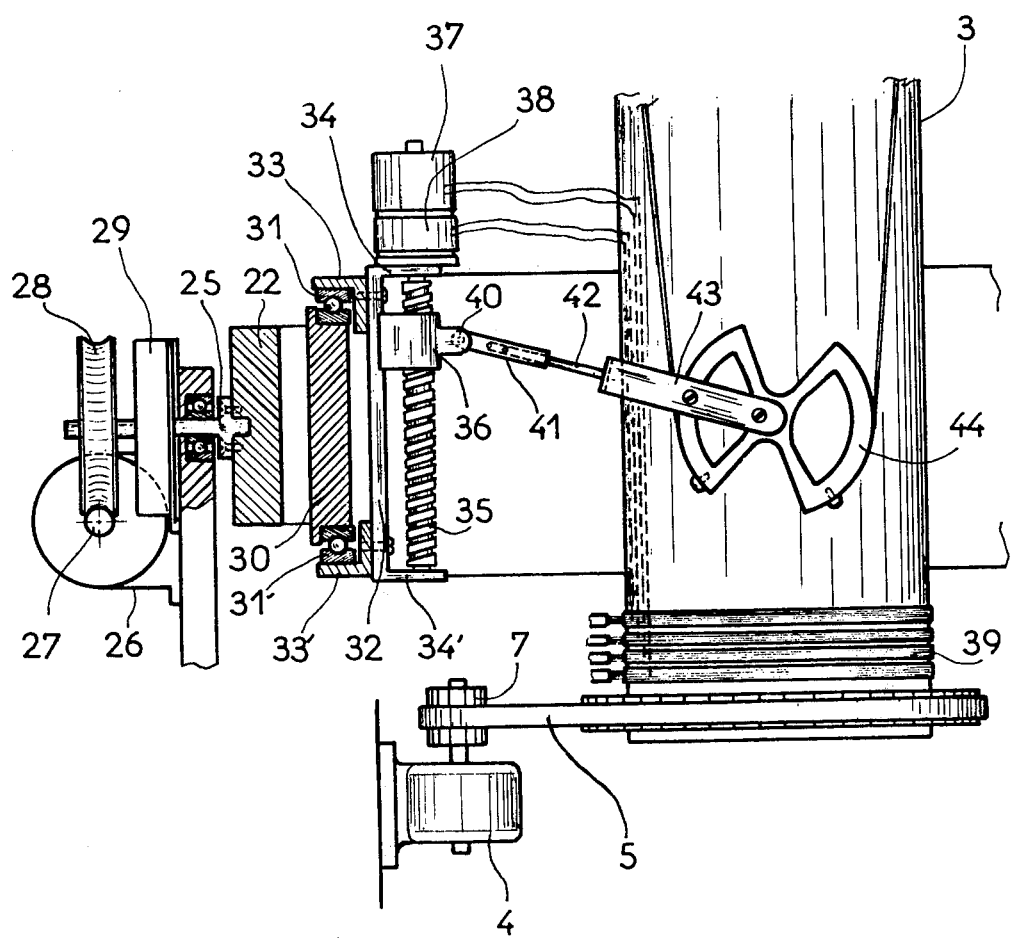
FIG. 3 is a view of a detail of the device shown in FIG. 1.

There is schematically shown in FIG. 3 the electrical connections and collector rings 39 provided to supply the drive motor of the worm and to convey the output of the sensor 38.

The nut 36 supports a pivot 40 and a rod 41 having a bore therein is pivotally connected to pivot 40. This bore slidingly accommodates the end portion of a stem 42 secured to a fork-like member 43, and the fork-like member is rotatably mounted in relation to the sighting tube 3 about an axis which intersects the optical axis bb' and the axis of the pivots 25,25' of the gimbal. The pivotal connection may be carried out by various means, for instance by means of journals secured to the tube 3 at diametrically opposed points and supporting the fork-like member 43. The geometrical axis of the linkage constituted by the fork-like member 43, the stem 42 and the hollow rod 41 is thus inclined in relation to the horizontal plane defined by the guideway 20 at a site angle S which varies in accordance with the position of the nut 36. Further, the telescopic arrangement of rod 41 and stem 42 permits adaptation of the length of the linkage to the position of the nut 36, the length being the larger as the site angle S is the greater in absolute value.

The angular motion of the fork-like member 43 is transmitted to the mirror 9 by a drive mechanism including in appropriate manner a pulley 44 secured to the fork-like member and centered at the pivotal axis thereof, a pulley 45 rotatable about the axis of the mirror 9 and two metal bands 46,47 tensioned between the pulleys 44,45. In the present embodiment, the pulley 44 is secured to the fork-like member 43 at two points in a manner to be perfectly rotatable therewith.

The diameter of the pulley 45 is twice that of the pulley 44, so that an angular displacement $\alpha$ of the axis of the sighting tube in relation to the vertical aa' results in an angular displacement $\alpha/2$ of the mirror 9. It will be understood that such an angular motion of the mirror compensates for the displacement $\alpha$. Thus, the sight line C remains always parallel to the geometrical axis of the stem 42 and its site angle is held constant and equal to the above-cited angle S.

It should be pointed out that the site angle S may be chosen positive, negative or nil.

Figure 4:
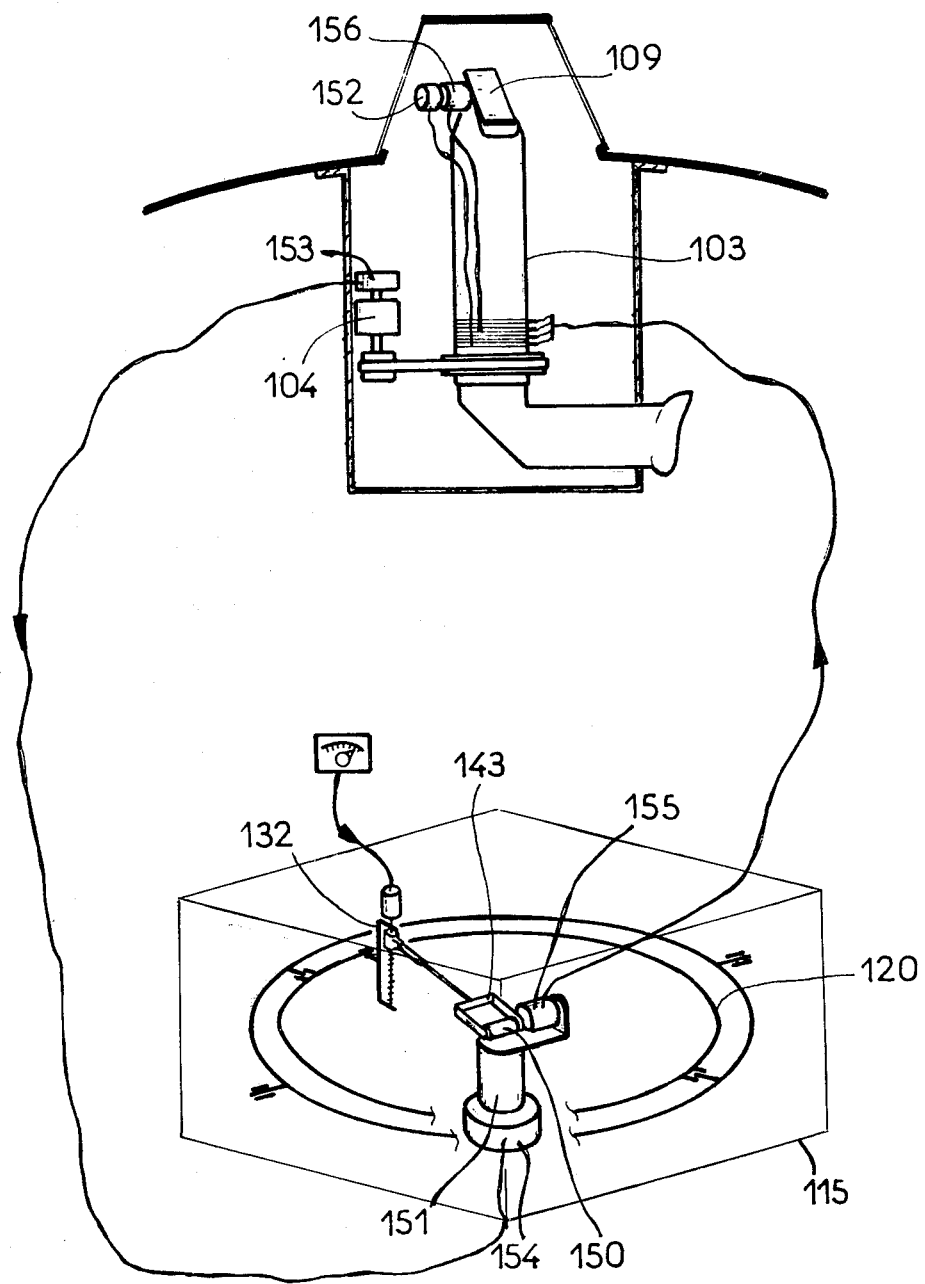
FIG. 4 is a schematic view of a further embodiment of the invention.

A further embodiment may be contemplated in which the device which defines the site angle S is separated from the optical system and the transmission is carried out by electrical means. Such an embodiment is schematically shown in FIG. 4, in which the components already present in the above-described embodiment are designated with the same reference numeral plus 100.

In this embodiment, the guideway 120 connected to the vehicle by gimbals is not disposed in surrounding relationship to the sighting tube 103, but is connected by gimbals to a separate housing 115 secured to the vehicle, and the fork-like member 143 is pivotally mounted on a shaft 150 which is driven for rotation about the vertical axis of the guideway by a motor 151. Further, a motor 152 is provided to control the angular position of the mirror 109.

The arrangement is such that, on the one hand, the motor 151 imparts to the movable unit including the fork-like member 143 and the support member 132 a movement identical with the panoramic motion effected by the sighting tube 103 driven by the motor 104, and on the other hand, when the shaft 150 is rotated by an angle $\alpha$, the mirror 109 is rotated by an angle $\alpha/2$.

The implementation raises no problem to one skilled in the art. In order to reproduce the panoramic motion, the motor 151 is servoed to reproduce the operation of the motor 104 and to this purpose, there are provided an angular motion sensor 153 associated with the motor 104 and an angular motion sensor 154 associated with the motor 151 and connected to the sensor 153. In order to control the position of the mirror 109, the motor 152 is likewise servoed to the angular position of the shaft 150 and there are provided an angular motion-sensor 155 mounted on the shaft 150 and an angular motion-sensor 156 associated with the motor 152 and connected to the sensor 155 in a manner to divide by two the angular displacement. The electrical circuitry to be used are conventional in servosystems and need not be further explained.

What I claim is:

1. A device for stabilizing the site of the sight line in an optical panoramic survey system carried by a vehicle, said system comprising a sighting tube rotatably mounted in the vehicle, driving means secured to the vehicle for rotating the tube about the optical axis thereof, and a reflector disposed at the top of the tube and rotatable about an axis normal to the optical axis, comprising a circular guideway, support means attached to the vehicle for supporting said guideway while holding vertical the axis thereof, a member guided along said guideway, a vertically adjustable member supported by said guided member, a link member with a variable length pivotally connected at one end to said adjustable member, a shaft secured to the other end of said link member, said shaft having an axis which intersects the axis of said guideway, means for imparting to said shaft a rotational movement identical with that of the tube, and means for transmitting the angular displacement from said shaft to said reflector with a 1:2 ratio.

2. A device according to claim 1, in which the link member comprises a pair of members in telescopic arrangement of which one is pivotally connected to said vertically adjustable member and the other extends into a fork-like member secured to the shaft.

3. A device according to claim 1, in which the vertically adjustable member comprises a nut which meshes with a worm supported by said guided member.

4. A device according to claim 1, in which the shaft is mounted for rotation in relation to the sighting tube, the axis of said shaft intersecting the optical axis and being parallel to the axis of the reflector, and including a drive mechanism between the shaft and the mirror.

5. A device according to claim 1, including a first motor connected to said driving means and servoed to impart to the shaft a rotational motion about an axis parallel to said optical axis identical with that of the sighting tube, an angular motion-sensor secured on the shaft and a second motor, connected to said sensor, for rotating the mirror, said second motor being servoed to impart to the mirror an angular displacement one-half that sensed by the sensor.

* * * * *